Aug. 1, 1944.    R. A. WINBORNE    2,354,933
CONTROL DEVICE
Filed Feb. 10, 1943                  3 Sheets—Sheet 3
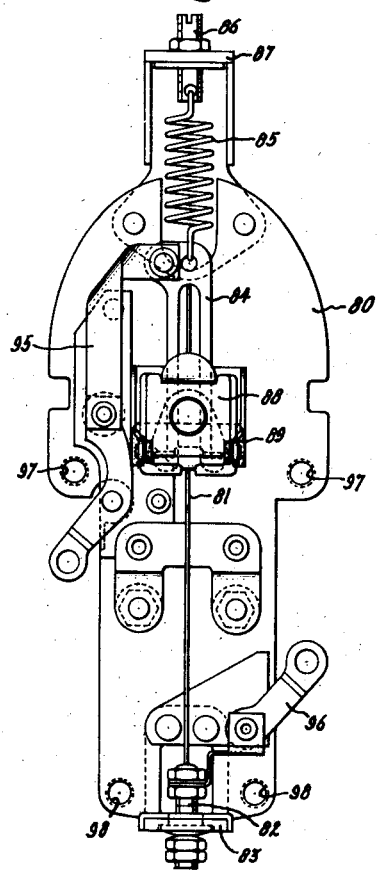
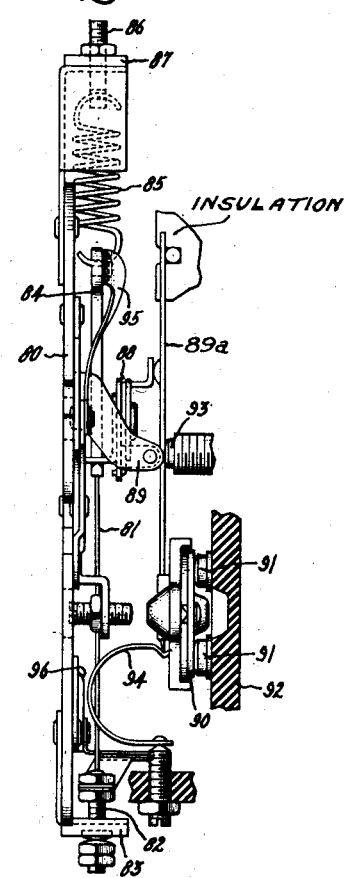
Inventor:
Russell A. Winborne,
by Harry E. Dunham
His Attorney.

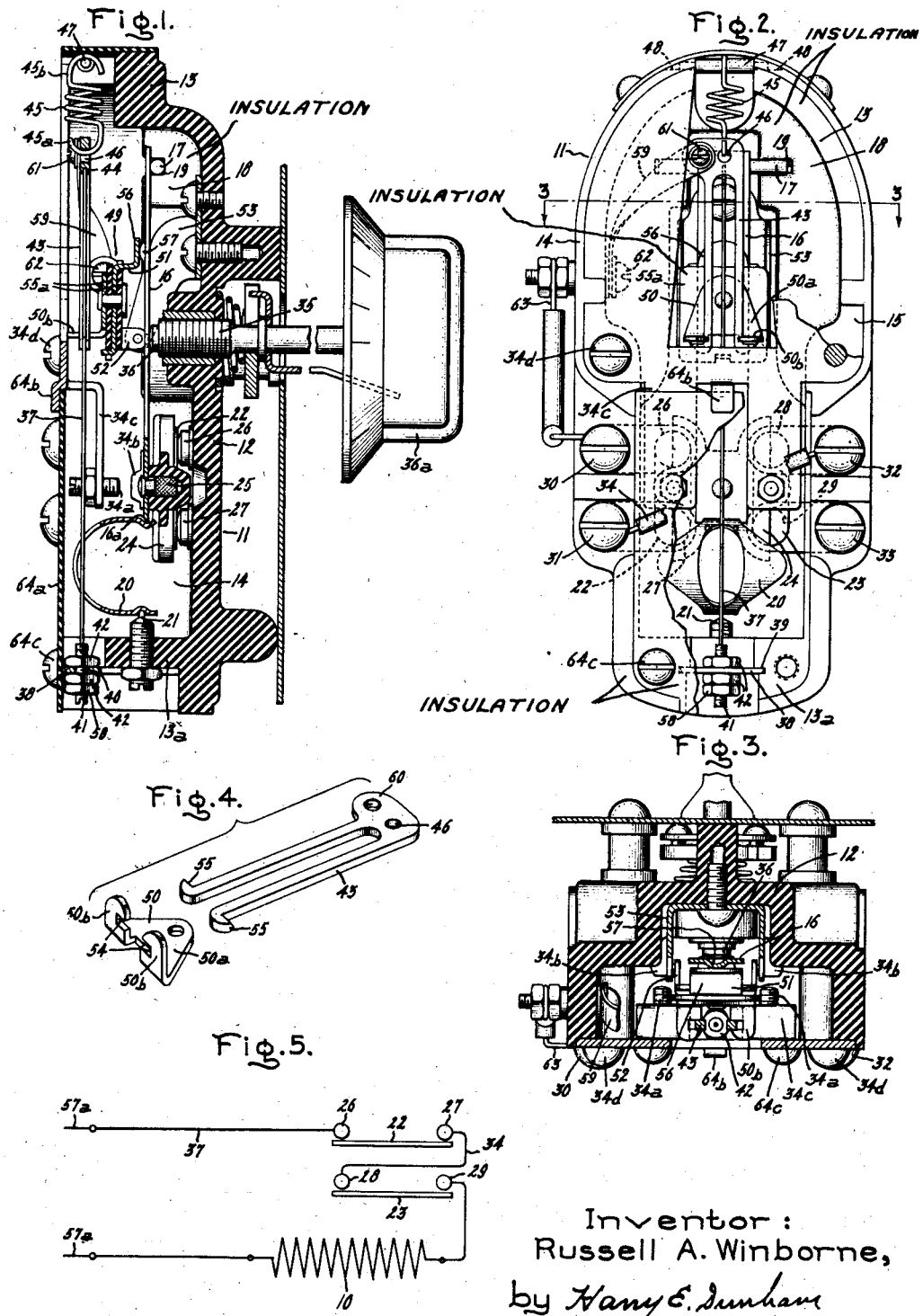

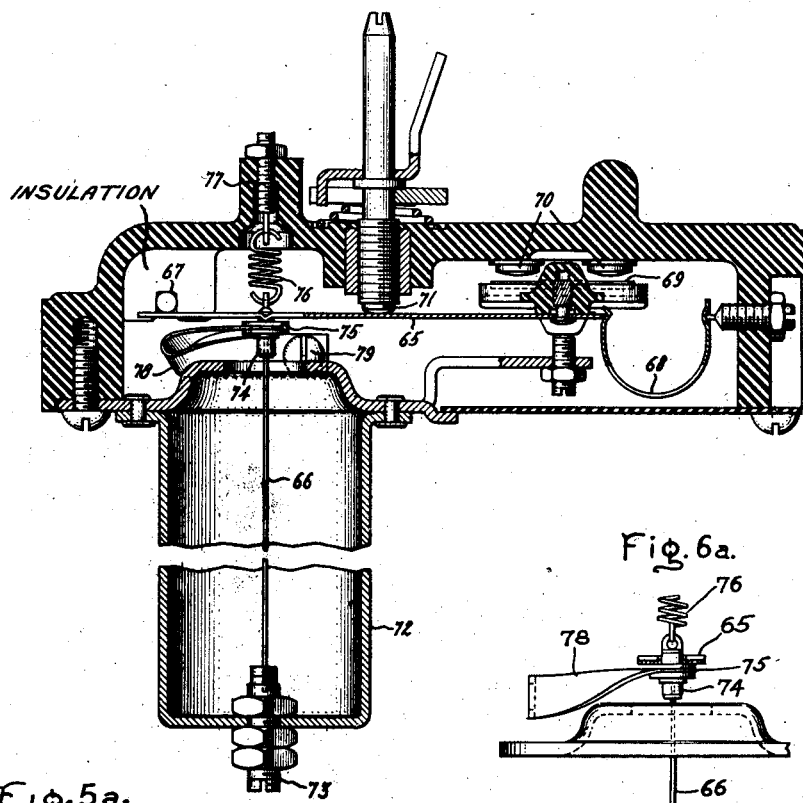
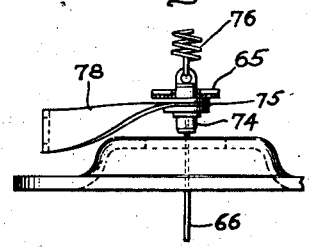
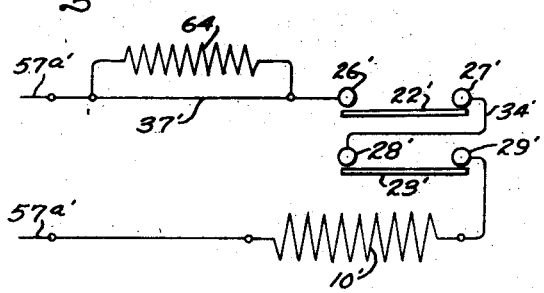

Patented Aug. 1, 1944

2,354,933

UNITED STATES PATENT OFFICE 2,354,933

CONTROL DEVICE

Russell A. Winborne, New York, N. Y., assignor to Edison General Electric Appliance Company, Inc., a corporation of New York Application February 10, 1943, Serial No. 475,420

9 Claims. (Cl. 200—113)

This invention relates to control devices, more particularly to a control device for controlling the energy supplied to a translation device, such as an electrical heater, and it has for its object the provision of a control device of this character which is simple, compact and inexpensive in construction, and yet one which provides an extremely sensitive, accurate and uniform controlling operation.

While not limited thereto, this invention is particularly applicable to the regulation or measurement of the watt input to an electrical translating device by the periodic interruption of the current, and controlling the relative lengths of the "on" period in which the device is energized to the "off" period in which it is deenergized; and it is especially useful in controlling electrically-heated appliances, such as range hotplates, ovens, fry kettles, food warmers, and the like.

In accordance with this invention in one form thereof, the regulation of the energy is controlled by means of a resilient control arm that operates a controlling element, such as a switch. The operation of the control arm is governed by means of a thermally expansible and contractable element, which in one embodiment of the invention is in the form of an elongated tensioned wire. The thermal expansion and contraction movements of the wire are imparted to a movable lever system which engages the control arm. Also engaging the control arm is an adjustable fixed fulcrum. The parts are constructed and arranged so that when the movable lever system is operated by the wire the control arm is caused to pivot about the fixed fulcrum and thereby operate the control element. Adjustment of the fixed fulcrum changes the setting of the control device to vary the proportion of time that the controlled device is "on," that is, energized, to the time that it is "off," that is, de-energized.

For a more complete understanding of this invention, reference should be had to the accompanying drawings in which Fig. 1 is a central, sectional view taken through a control device embodying this invention; Fig. 2 is a bottom plan view of the control device shown in Fig. 1, parts being broken away so as to illustrate certain details of construction; Fig. 3 is a sectional view taken through the line 3—3 of Fig. 2 and looking in the direction of the arrows; Fig. 4 is an expanded perspective view of certain elements used in the control device of Figs. 1–3; Fig. 5 is a diagrammatic representation of certain elements of the control device, and of a heating element controlled by the control device; Fig. 5a is a diagrammatic view similar to Fig. 5 but illustrating a modification of the control device; Fig. 6 is a sectional view of a control device of modified form arranged in accordance with this invention; Fig. 6a is an elevation of certain elements of the control device shown in Fig. 6 in positions at right angles to the positions they occupy in Fig. 6, and a part thereof being shown in section so as to illustrate more clearly certain details of construction; Fig. 7 is a plan view of a portion of the control device in modified form arranged in accordance with this invention; and Fig. 8 is a side elevation of the control device shown in Fig. 7.

Referring more particularly to Figs. 1–5 inclusive, this invention has been shown in one form as applied to a control device for regulating the watt input to an electrically heated appliance 10, shown diagrammatically in Fig. 5, by periodically interrupting the current supplied to it.

The control device comprises a casing 11 having a top wall 12, an approximately semi-circular end wall 13, a substantially straight end wall 13a opposite the wall 13, and also side walls 14 and 15. These various walls of the casing preferably will be integrally united, and they are formed from a suitable electrically insulating material, such as a phenol condensation product.

Mounted within the casing 11 and extending longitudinally thereof is a resilient control arm 16 which is pivoted at one end and has its other end free to move. As shown, the upper end of the arm 16, as viewed in Figs. 1 and 2, carries a transverse shaft 17, which shaft is rigidly secured to the arm in any suitable way, as by welding. The casing is provided with bearing seats 18 for the shaft 17, which are preferably formed integrally with the walls of the casing. These seats are provided with bearing seats 19 in which the ends of the shaft 17 are received, as clearly shown in Figs. 1 and 2. The bearing seats are open, but the shaft 17 is held in them in a manner which will be explained in greater detail hereinafter.

Coacting with the free movable end of the control arm 16 is a U-shaped spring member 20 having one leg bearing on the knife-edge 16a provided on the end of the control arm and its other leg bearing on a fixed adjustable pivot 21 which is mounted in the end wall 13a of the casing. The pivotally mounted spring 20 functions to move the control arm 16 with a snap action between a pair of controlling positions.

This free end of the control arm carries a pair of bridging contacts 22 and 23. As shown, these contacts are carried by an electrically-insulated supporting member 24 which is loosely attached to the free end of the control arm 16 through a drive screw 25. The bridging contact 22 cooperates with a pair of spaced, fixed contacts 26 and 27, while the bridging contact 23 cooperates with a pair of spaced, fixed contacts 28 and 29. The fixed contacts 26 and 27 are electrically connected to binding posts 30 and 31, while the fixed contacts 28 and 29 are electrically connected to binding posts 32 and 33. The binding posts 31 and 32, and hence the contacts 26 and 27 are electrically connected together by means of a suitable lead 34.

One position of the control arm 16 is defined when the bridging contacts 22 and 23 engage with their respective pairs of fixed contacts 26 and 27, and 28 and 29. The other, or open switch position of the control arm, is defined by stops 34a (Figs. 1 and 3) which engage abutments 34b provided on the contact support 24. The stops 34a are mounted upon a metallic bracket 34c which is clamped to the casing by means of screws 34d, and which closes the major portion of the upper half of the bottom of the casing 11, as shown in Fig. 2.

Mounted in the top wall 12 of the casing 11 is an adjusting screw 35 which on its inner end carries a rounded portion 36 which constitutes a fulcrum against which the upper side, that is the right-hand side as viewed in Fig. 1, of the control arm 16 is adapted to engage. The resilient control arm is arranged to pivot about this portion 36 as a fulcrum to control the opening and closing of the bridging contacts 21 and 22. The screw may be adjusted by the control knob 36a.

The operation of the control arm 16 about the fulcrum 36 is controlled by a thermally extensible and contractable, elongated element 37 in the form of a wire, as shown. The wire is arranged longitudinally within the casing 11 under the control arm 16 and it extends from the end wall 13a to the opposite end wall 13. It is anchored to the end wall 13a through an anchor plate 38. This plate, as shown more clearly in Fig. 2, has its side edges received in slots 39 provided for them in the end wall 13a so as to anchor the plate firmly to the casing; and it also has an aperture 40 in which a headless screw 41 is mounted and which is clamped to the plate by means of nuts 42 threaded on the screw on opposite sides of the plate, as shown. The screw 41 is provided with an axial opening in its inner end which receives the lower end of the wire 37, and the wire is secured in the aperture in any suitable way as by brazing.

The opposite end of the wire 37 is attached to a fork-shaped anchor member 43, the wire being inserted in an aperture 44 in the nexus of the member 43 and likewise is secured therein in any suitable way as by brazing. The anchor 43 is attached to one end of a tension spring 45, and for this purpose the nexus of the member is provided with an aperture 46 through which the end 45a of the spring is directed. The opposite end 45b of the spring is anchored to a pin 47 which, as shown more clearly in Fig. 2, is provided with reduced end sections that are received in depressed bearing seats 48 provided for them in the end wall 13 of the casing.

The spring 45 tensions the wire 37 at all times so that the wire is kept taut while it extends and contracts responsively to increases and decreases in its temperature. The extending and contracting movements of the wire are transmitted to the flexible control arm 16 through the anchor 43 and a lever system 49. The lever system 49 comprises an L-shaped lever arm 50, which is shown more clearly in Fig. 4. This lever arm has one leg 50a rigidly attached to a second lever member 51 (Figs. 1 and 3). The member 51 is provided at its sides with projecting lugs 52 to form supports which carry outwardly extending shafts, as shown in Fig. 3; these shafts are journaled in the two legs of a U-shaped bracket 53 mounted on the top wall 12 of the casing. The arms 50b of the lever arm 50 carry a pair of bearing seats 54 for receiving knife-edge bearings 55 extending outwardly from the two legs of the fork-shaped anchor member 43, whereby when the wire 37 expands and contracts the lever arm 50 is operated to pivot the lever member 51 on the bracket 53. The lever system members 50 and 51 are riveted together, as shown more clearly in Fig. 1, and they are electrically insulated from each other and from the rivet by sheets of insulating material 55a.

The lever system 49 magnifies the small movement of the wire 37 by providing a mechanical advantage in the lever arms 50 and 51.

The end of the lever 51 opposite its pivoted end is provided with an offset lip to engage the control arm 16, as indicated by the numeral 56. This offset end 56 engages a boss 57 formed in the control arm 16 on its side opposite to the fixed fulcrum 36, as shown more clearly in Figs. 1 and 3, and it functions both as a movable pressure member to operate the switch arm, and also to hold the switch arm 16 in the open bearing seats 19. The boss 57, as shown, is located between the pivoted end of the switch arm and the fulcrum 36.

In the operation of the control device to control the wattage input to the appliance 10, it is to be understood that the lower end of the wire 37 will be electrically connected to one side of the electrical supply source 57a through the screw 41, an outer nut 58 being provided to clamp the electrical connection against the outer nut 42. The opposite end of the wire 37 is electrically connected to the fixed contact 26 through a lead 59 which has one end electrically connected to an ear 60 of the anchor 43 through a screw 61, and which has its opposite end secured to a binding post 62 in the side wall 14 of the casing. The binding post 62 is electrically connected with the binding screw 30 of the fixed contact 26 through a lead 63. Further, it is to be understood that the fixed contact 29 will be electrically connected through its binding post 33 with one terminal of the heater 10, as shown diagrammatically in Fig. 5; the other terminal of this heater 10 is connected with the other side of the supply source. It will be understood, therefore, that when the bridging contacts 21 and 22 are closed, the wire 37 and the heater 10 will be connected in series across the supply source and both will be heated simultaneously, while when the bridging contacts are opened the circuit through both the wire 37 and the heater 10 will be broken.

As pointed out previously, the amount of energy supplied to the heater 10 is controlled by the wire 37 which alternately opens the bridging contacts 21 and 22 and then permits them to reclose. When the contacts are closed and the wire is heating up it will extend as its temperature rises, the spring 45 functioning to keep the wire taut and also pulling the anchor 43 upwardly in the casing, as viewed in Fig. 1. As it pulls the anchor upwardly it pivots the lever system 49 clockwise, as viewed in Fig. 1, and causes the lip 56 to apply increasing pressure on the boss 57 on the control arm 16. In other words, it tends to flex the arm about the fulcrum 36 as a pivot, and in such a direction as to move the contacts 21 and 22 away from their associated fixed contacts. Eventually, when the wire 37 attains a predetermined high temperature it will have deflected the free end of the arm to the left, as viewed in Fig. 1, so far that the spring 20 will act to snap it quickly away from the fixed contacts, and move the extensions 34b against the stops 34a. This operation, of course, will deenergize the heater 10 and also will disconnect the wire 37 which then will cool. As it cools it contracts and pulls the anchor 43 downwardly against the force of the spring 45 and at the same time it permits the lever system 49 to move counterclockwise. This relieves the pressure on the control arm boss 57, and when the anchor 43 has been retracted to a predetermined degree the lower end of the arm 16 will have been deflected to the right to such an extent that the spring 20 can snap the contacts 21 and 22 closed to repeat the cycle just described. In this way, the control device will intermittently energize the heater 10 so as to regulate the power supplied to it.

The amount of power supplied depends upon the setting of the control knob 36a. If the control knob be turned to move the abutment 36 outwardly to the right the proportion of time that the contacts will remain closed to the time that they are open will become greater, and hence the amount of energy supplied to the heater 10 will be greater. It is contemplated that the knob may turn the abutment 36 outwardly so far that the spring 45 cannot operate the lever system 49 to open the contacts 22 and 23 regardless of how far the wire 32 expands. In other words, the amount of energy fed will be continuous and will be the maximum. On the other hand, it is contemplated that the knob may position the abutment 36 inwardly so far that it will hold the bridging contacts 21 and 22 permanently open. This constitutes an "off" position of the control device, and may be so identified on the control knob. In this position the wire 37 cannot function to close the contacts to energize the heater, regardless of the temperature condition of the wire 37.

When the control device is used to control relatively heavy currents, the thermal wire may be shunted by means of a suitable resistance. Such an arrangement is shown in Fig. 5a. Here, the thermal wire 37a is shunted by a resistance 64. By adjusting the amount of resistance in this shunt path, the control device may be adapted to handle a large range of currents. The remaining elements shown in Fig. 5a correspond exactly with elements of Fig. 5 and are designated by the same numerals, except that they are primed.

The lower half of the casing 11 is closed at the bottom by means of a cover 64a which has one end fitted under a downwardly and forwardly projecting lip 64b on the bracket 34c, and which has its opposite end secured to the casing by means of screws 64c.

In Fig. 6, there is illustrated a modified form of this invention which generally is like the first form just described, but here the control arm 65 of the device and the thermally extensible and contractable wire 66 are arranged at right angles to each other instead of in parallel relation as in the first form. As shown, the control arm 65 is pivoted in bearing seats 67 at one end, and bearing on its opposite free end is a U-shaped snap-action spring 68. This free end carries a pair of bridging contacts 69 which coact with two pairs of spaced fixed contacts 70. Intermediate the ends of the arm is an adjustable abutment 71. Thus far, the parts all are constructed and arranged in precisely the same way as are the corresponding parts of the first form of this invention. Here, however, as pointed out previously the wire 66 is positioned at right angles to the control arm 65. As shown, there is attached to the casing of the switch an auxiliary metallic casing 72 which houses the wire 66. The wire, at its lower end, is attached to an adjustable fixed anchor 73 and at its other end it is attached to a headless screw 74. Mounted upon this screw is a member 75 which constitutes the movable pressure member for actuating the switch arm 65 and which corresponds to the movable pressure member 56 of the first form of this invention. Attached to the upper end of the screw 74 is a tension spring 76 which is anchored to an adjustable screw 77, the spring 76 functioning to continuously tension the wire 66. The screw 73 at the bottom corresponds to the screw 41 of the first form of the invention and it is contemplated that this screw will be attached to the first conductor of an electrical supply source. The upper end of the wire is connected through the member 75 and a lead 78 to a binding post 79 which corresponds to the binding post 62 of the first form. This binding post 79 is electrically connected to the first contact of the first pair of fixed contacts, and the second fixed contact of this pair is connected to the first contact of the second pair, while the second contact of the second pair is electrically connected to one terminal of the controlled appliance, the other terminal of which is connected to the second conductor of the electrical supply source, all in precisely the same way as is the binding post 62 of the first form connected to the fixed contact 26, as fixed contact 28 is connected to fixed contact 22, and as fixed contact 23 is connected to the controlled appliance, as fully described in connection with the first form of the invention.

In the operation of this device, when the wire 66 is heated, the spring draws the pressure member 75 upwardly and pivots the control arm 65 on the fixed abutment 71 so as to move it to such a position that the snap spring 68 can quickly open the contacts. When the wire 66 contracts as it cools it draws the pressure member 75 downwardly and thereby permits the switch arm to reclose, all as previously described in connection with the first form.

It will be observed that in the first form of the invention disclosed in Figs. 1-4, it is the differential expansion between the thermally responsive wire 37 and the insulating casing 11 which effects the operation of the control elements. In Fig. 6, the operation in the main is effected by the differential expansion between the thermal element 66 and the metallic casing 72. In Figs. 7 and 8, there is illustrated another form of this invention in which the elements are controlled by means of the differential expansion between the thermal element and a metallic member. The general arrangement of the elements shown in these figures is the same as the corresponding elements shown in Figs. 1–4, except that here substantially all of the controlling elements are mounted upon a metallic base 80 which may be made of steel. Here, it will be observed that the thermally responsive element 81 is anchored at one end to an adjustable screw 82 which is mounted in an end wall 83 attached to the base 80. The other end is connected to a U-shaped anchor 84, similar to the anchor 43 of the first form. This member 84 is attached to a tension spring 85 which is anchored to an adjustable screw 86 anchored in an end wall 87 also attached to the base.

Here, the lever system 88 is pivotally supported by means of brackets 89 which are fastened to the base.

The lever system 88 operates a pivotally mounted resilient control arm 89a, carrying bridging contact structure 90 which cooperates with fixed contacts 91 mounted in an insulating casing 92, all as fully described in connection with the first form of this invention, and as there described the resilient arm 89a coacts with an adjustable fulcrum 93, and further as there described a U-shaped snap spring 94 coacts with the movable end of the control arm. Secured to the base 80 are suitable leads 95 and 96 for electrically connecting the thermal element 81 in the circuit to be controlled. Otherwise the arrangement of the controlled contacts and their connections with the thermal element 81 and with the controlled heater all are precisely the same as described in connection with the first form of the invention. And the insulating housing 92 will be the same as the housing 11 of the first form. The metallic plate 80 will be secured to this housing by screws directed through pairs of apertures 97 and 98 in the base.

It will be observed in this case that since the thermal element 81 is secured to the metallic base 80 through the screw 82, and the anchor and spring system 84, 85, the operation of control arm 89a is effected by the differential expansion between the thermal element and the metallic base 80.

From the foregoing description, it will be seen that I have provided a temperature control device which is of simple, inexpensive and rugged construction having relatively few elements and relatively few interconnected moving parts that offer little frictional restraint to the movement of the elements. The control device may be readily and simply adjusted by the control knob 36a over a wide range, and this range may be extended by the shunt connection 64 around the thermally responsive wire.

While this invention is particularly useful as a timer to regulate the energy supplied to a controlled heating device, it may also be used as a thermostat that responds directly to the temperature of the device to control the temperature held in a predetermined way. In this case, the control device would be located so that the wires 27, 26, 21 would be in thermal relation with the device to be controlled.

And while the control device of this invention has been shown as controlling an electric heater, it will be understood that it has many other uses. For example, it may be used as a relay for motor starting such as used in a refrigerator control. Also, it may be used as a "flasher," and further, as a room thermostat.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A control device comprising a pivotally mounted resilient operating member, circuit control means actuated by said operating member, an elongated extensible and contractable wire-like thermal element, means anchoring one end of said thermal element, a loading spring attached to the other end of said thermal element functioning to tension it, connection means between said thermal element and said resilient operating member for causing movements thereof as said thermal element extends and contracts, normally-fixed fulcrum means engaged by said operating member as it is moved by said connection means to effect controlling movements of said operating member to actuate said circuit control means by predetermined movements of said thermal element, and means for adjusting the position of said fulcrum means to predetermine the movements of said thermal element required to effect circuit controlling movements of said operating member.

2. In a control device, a resilient operating member pivotally mounted at one end and having its opposite end free to move, an adjustable fulcrum between said ends against which one side of said operating member is movable, a pressure member between said first-named fulcrum and the pivoted end bearing on the other side of said operating member, a thermally expansible and contractable wire, means anchoring one end of said wire, a spring attached to the other end of said wire tensioning said wire, and an operable connection between said pressure member and said wire so that the position of said pressure member is changed to control the movements of said operating member against said fulcrum responsively to the extension and contraction of said wire as its temperature changes.

3. A control device comprising a resilient operating member, means supporting one end of said member and the opposite end being free to move, and said member being constrained intermediate its end by a fulcrum and a pressure member spaced apart lengthwise of said member and acting on opposite sides of said member, said fulcrum being manually adjustable in the plane of movement of said member, means movably supporting said pressure member so that it can be moved in the plane of movement of said member, a tensioned elongated thermally extensible and contractable member, and connections between said supporting means and said member for translating the movements of said member to said pressure member and thereby to said operating member.

4. A control device comprising an elongated thermally extensible and contractable wire, means for anchoring one end of said wire, a spring attached to the other end of said wire so as to tension it, the wire elongating and contracting as its temperature rises and falls, an elongated operating arm, a shaft attached to one end of said arm, open bearing means receiving said shaft, a snap action spring acting on the other end of said arm, a fulcrum for engaging the side of said arm facing said bearing means at a point intermediate its ends, a pressure member operated by said wire bearing on the other side of said arm to hold it in said bearing means and to control its movement with reference to said fulcrum, and control means operated by the movement of said arm.

5. A control device comprising a movable control arm, a pivoted lever having one portion coacting with said arm to control its movements, a bearing seat in another portion of said lever, an elongated thermally expansible and contractable wire, means anchoring one end of said wire, a movable anchor for the other end of said wire having a part bearing on said bearing seat, and a spring attached to another part of said movable anchor so as to apply a tensioning force to said wire, the extension and contraction movements of said wire being transmitted to said control arm through said movable anchor and said lever.

6. A control device comprising a movable control arm, a pivoted lever having one end bearing on said arm to control its movement in accordance with the movement of said lever, a pair of spaced bearing seats on the other end of said lever, an elongated thermally extensible and contractable wire, a fixed anchor for one end of said wire, a fork-shaped anchor for the other end of said wire provided with bearings on the extremities of the two legs thereof resting in said bearing seats, means securing said other end of said wire to the nexus of said fork-shaped anchor, and a tension spring attached to said nexus for tensioning said wire.

7. A control device for controlling an electric heater comprising a movable control arm, a tensioned elongated thermally extensible and contractable wire connected to said control arm to control its movements, two pairs of associated spaced fixed contacts, two bridging contacts operated by said control arm for simultaneously bridging said two pairs of contacts and for simultaneously opening them, the wire closing said bridging contacts when it contracts responsively to cooling and opening them when it extends responsively to heating, and electrical connections between the first one of the first pair of contacts and one end of said wire, and between the second contact of said first pair and the first contact of said second pair, and the second contact of said second pair being adapted to be connected to one terminal of said heater so that when the other terminal of said heater is connected to one side of said supply source, and the other end of said wire is connected to the other side of said supply source, said wire and heater are simultaneously energized and connected in series when said control arm closes said bridging contacts and are simultaneously de-energized when said bridging contacts are opened.

8. A control device comprising a pivotally mounted resilient operating member, circuit control means actuated by said operating member, an elongated extensible and contractable wire constituting a thermal element, a metallic base, means anchoring one end of said thermal element to said base, a loading spring attached to the other end of said thermal element functioning to tension it, means anchoring said spring to said metallic base, movable connection means mounted on said base connecting said thermal element with said resilient operating member for causing movements of said operating member as the thermal element extends and contracts relatively to said metallic base, normally-fixed fulcrum means engaged by said operating member as it is moved by said connection means to effect controlling movements of said operating member to actuate said circuit control means by predetermined movements of said thermal element, and means for adjusting the position of said fulcrum means to predetermine the movements of said thermal element required to effect circuit controlling movements of said operating member.

9. A control device comprising a pivotally mounted resilient operating member, circuit control means actuated by said operating member, an elongated expansible and contractable wire-like thermal element, means anchoring one end of said element and a loading spring attached to the other end thereof functioning to tension it, connection means between said thermal element and said resilient operating member for causing movements thereof as said thermal element extends and contracts, a normally fixed, but adjustable, fulcrum means engaged by said operating member as it is moved by said connection means to effect controlling movements of said operating member to actuate said circuit control means by predetermined movements of said thermal element, and electrical connection means connecting said thermal element in electric circuit with said circuit control means.

RUSSELL A. WINBORNE.